United States Patent [19]

Kuntze

[11] Patent Number: 4,555,854
[45] Date of Patent: Dec. 3, 1985

[54] ROLL TAPE MEASURE

[75] Inventor: Richard Kuntze, Leichlingen, Fed. Rep. of Germany

[73] Assignee: Karl Kuntze (GmbH & Co.), Solingen, Fed. Rep. of Germany

[21] Appl. No.: 622,327

[22] Filed: Jun. 19, 1984

[30] Foreign Application Priority Data

Jul. 1, 1983 [DE] Fed. Rep. of Germany ....... 3323706

[51] Int. Cl.$^4$ ............................................. G01B 3/10
[52] U.S. Cl. ...................................................... 33/138
[58] Field of Search ............................... 33/138, 137 R

[56] References Cited

U.S. PATENT DOCUMENTS

| 2,833,534 | 5/1958 | Foster | 33/138 |
| 3,381,916 | 7/1968 | Edgell | 242/107.3 |
| 4,023,277 | 5/1977 | Fizer | 33/138 |
| 4,068,383 | 1/1978 | Krebs | 33/138 |
| 4,121,785 | 10/1978 | Quenot | 33/138 |
| 4,443,944 | 4/1984 | Beesley | 33/138 |
| 4,487,379 | 12/1984 | Drechsler et al. | 33/138 |

FOREIGN PATENT DOCUMENTS

| 2545203 | 5/1976 | Fed. Rep. of Germany. |
| 2711100 | 3/1977 | Fed. Rep. of Germany. |
| 4521035 | 4/1966 | Japan | 33/138 |

Primary Examiner—Willis Little
Attorney, Agent, or Firm—John C. Smith, Jr.

[57] ABSTRACT

In order to simplify and improve the fly-back suppressor in a roll tape measure having a box-shaped housing 1, serving as a handle and made up of two rigidly interconnected halves 2, 3 of elastic plastic, an approximately dish-shaped drum 5 subjected to the force of a tension spring and mounted on a shaft 4 or a bolt 15, a measuring tape 9 wound onto the drum and a manually operable fly-back suppressor for the said tension spring. The housing 1 contains a brake body 12, 17 which rests against the drum under the effect of spring pressure and which can be operated from the outside.

5 Claims, 6 Drawing Figures

ROLL TAPE MEASURE

BACKGROUND OF THE INVENTION

This invention relates to a roll tape measure of the kind having a box-shaped housing made up of two rigidly interconnected halves of elastic plastic and serving as a handle, an approximately dish-shaped drum subjected to the force of a tension spring and mounted on a shaft, a measuring tape wound onto the drum, and a manually operable fly-back suppressor for the said tension spring.

In a known roll tape measure (German Pat. No. 25 45 203) the fly-back suppressor for the tension spring is formed by a shaft which serves to support the drum and which is shaped concentrically onto a prestressed tongue produced by recesses in one of the housing halves and which functions as a pressure bolt, and also by an axially resilient tongue which is produced by recesses in the wall of the other housing half and which serves as an abutment for the shaft and which is provided at its free end with a stop cam against which cams arranged in a circle around the drum make impact under the effect of the tension of the tension spring. By pressure with the finger on the resilient tongue bearing the shaft the stop cam is removed from the cams of the drum, which is subjected to spring tension by pulling out the measuring tape, the drum thus being enabled to rotate back again.

SUMMARY OF THE INVENTION

It is the object of the present invention to simplify and improve the known fly-back suppressor of a roll tape measure of the category described at the beginning.

To attain this object the present invention provides a roll tape measure having a box-shaped housing made up of two rigidly interconnected halves of elastic plastic and serving as a handle, an approximately dish-shaped drum subjected to the force of a tension spring and mounted on a shaft, a measuring tape wound onto the drum, and a manually operable fly-back suppressor for the tension spring, wherein an annular brake body, coaxial with the shaft serving as a support for the drum, is formed integral with the inner face of the wall of one of the housing halves and rests, in the idle position, against the cheek of the drum, under the effect of the pressure exerted by the said one housing half, and the free end of the shaft extends far enough towards the inner face of the wall of the said one housing half to ensure that when pressure is exerted on the other housing half, at the location where the shaft is shaped onto it, the brake body detaches itself from the cheek of the drum in order to release the measuring tape.

The fly-back suppressor proposed by the invention considerably simplifies the roll tape measure by comparison with the roll tape measure already known inasmuch as the provision of a resilient tongue associated with the shaft and provided with a stop cam and the provision of cams on the drum which interact with the said stop cam are now eliminated. This results in a further valuable advantage which resides in the fact that the fly-back suppressor becomes effective immediately after its being released, so that the measuring tape is fixed in position in accordance with the exact length to which it has been pulled out. This enables accurate measurements to be effected. In contrast to the roll tape measures hitherto known the operation of drawing out and winding back the measuring tape is noiseless.

In a further embodiment of the present invention the object is attained in that a known type of pressure bolt which is axially displaceable in a shaft body designed to support the drum and of which one end extends from the housing, is provided, at its other end projecting in relation to the shaft body, with an integrally formed approximately circular enlargement carrying a likewise integrally formed annular brake body at its inner side, and elastic prestressed tongues, arranged annular, are formed integral with the other side of the circular enlargement, the brake body resting against the cheek of the drum under the effect of the pressure of the elastic prestressed tongues.

The construction of the roll tape measure according to the further embodiment provides the advantage that the brake body rests against the cheek of the drum with greater pressure. It also enables the housing halves to be made of a rigid material.

In an advantageous further development of the invention the shaft is shaped by the end farther away from the free end, in a manner known per se, onto an axially resilient tongue obtained in the wall of one housing half by the production of recesses therein.

The process of actuating the shaft in order to release the brake body is rendered easier thanks to the fact that even a gentle pressure of the finger on the shaft suffices to release the brake body.

In a further advantageous embodiment of the roll tape measure according to the further development of the invention the circular enlarged portion of the pressure bolt is bevelled on the periphery towards the pressure bolt and forms the brake body, while an annular brake casing is formed integral with the cheek of the drum, the internal periphery of the annular brake casing being bevelled parallel to the bevelling of the brake body.

This design for the brake surfaces improves the braking action.

BRIEF DESCRIPTION OF THE DRAWINGS

Some embodiments of the invention will now be described by way of example and with reference to the accompanying drawings in which.

DESCRIPTION OF THE PREFERRED EMBODIMENTS

Figure 1:
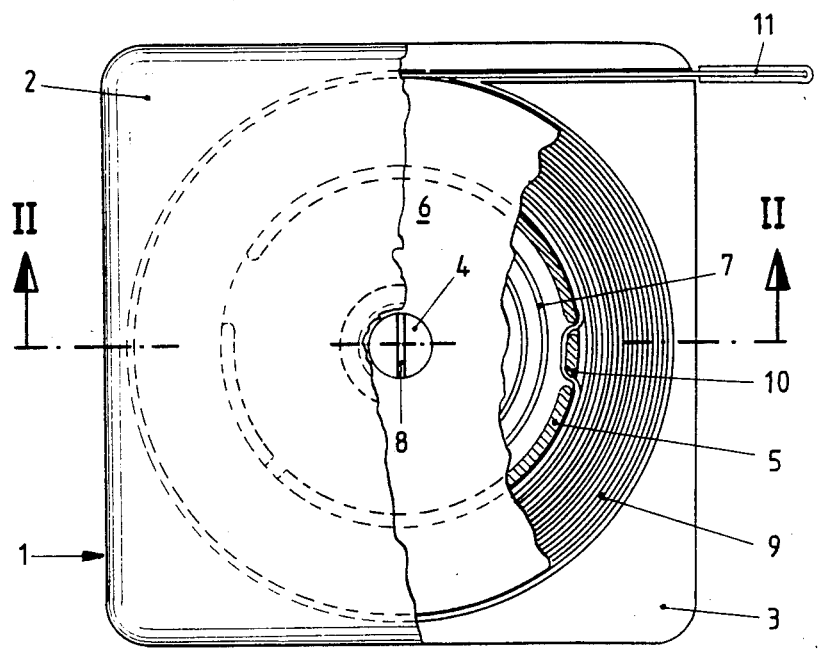
FIG. 1 is an elevational view, partly broken away and in section, illustrating a roll tape measure according to the invention.
Figure 2:
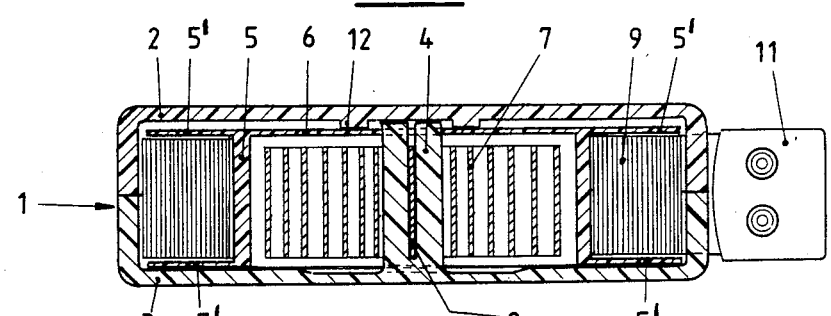
FIG. 2 is a sectional view taken along the line II—II of FIG. 1.

FIGS. 1 and 2 show a roll tape measure which consists of a housing 1 made up of two rigidly interconnected housing halves 2 and 3 made of elastic plastic. A plastic shaft 4 is formed integral with the inner face of the wall of the housing half 3 and supports a drum 5. The reference numeral 6 designates the cheek of the drum 5. A spiral spring 7 is rolled into the drum 5. This spiral spring 7 is secured by one of its ends in a slit 8 of the shaft 4 and by its other end to the drum 5. The reference numeral 9 designates a measuring tape which is rolled up onto the drum 5 and guided between two projections $5^1$ of the drum 5. The measuring tape 9 is secured by one of its ends in slits 10 in the wall of the drum 5, while its other end, provided with a handle 11, extends outward through a slit in the wall of the housing 1.

According to the invention an annular brake body 12, formed integral with the housing half 2, is provided on the inner face of the wall of the housing half 2, is coaxial with the plastic shaft 4 and rests against the cheek 6 of the drum 5 under the effect of the pressure exerted by the housing half 2. To release the brake body 12 from the cheek 6 of the drum 5, thus enabling the drum 5 to rotate back, pressure with the finger is exerted on the housing half 3, at the location at which the shaft 4 is integrally formed therewith, the said housing half 3 being thus slightly pressed in, in which process the plastic shaft 4, by its free end, causes the housing half 2 to bulge slightly outwards, the brake body 12 thus being released from the cheek 6 of the drum 5. The drum 5 is then able to rotate back. When the pressure of the finger ceases the housing halves 2 and 3 resume their original shapes at the locations where they underwent deformation, the brake body 12 being then pressed against the cheek 6 of the drum 5 so firmly that the said drum 5 is blocked. To increase the elasticity of the two housing halves 2 and 3 at the locations where the deformation is required the cross section of the wall of the said two housing halves 2 and 3 can be appropriately reduced.

Figure 4:
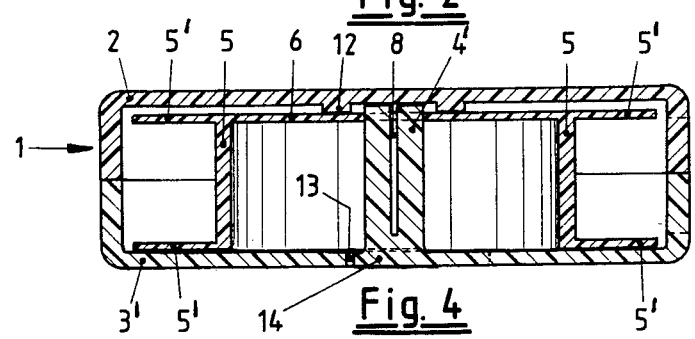
FIG. 4 is a sectional view taken along the line IV—IV of FIG. 3.
Figure 3:
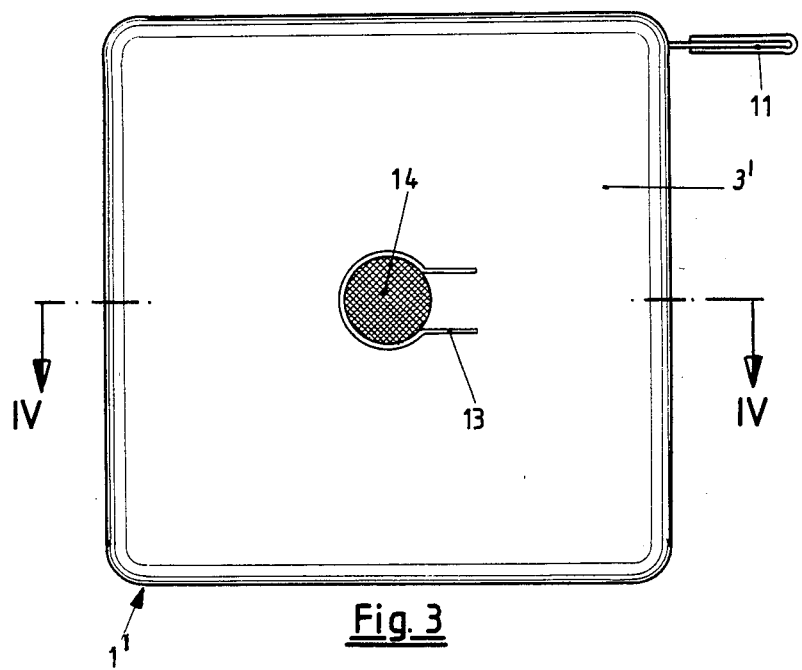
FIG. 3 is an elevational view of the roll tape measure according to an alternative embodiment of the invention, without measuring tape and tension spring.

In the roll tape measure shown in FIGS. 3 and 4 of the drawings the plastic shaft 4 of the embodiment shown in FIGS. 1 and 2 is substituted by a plastic shaft $4^1$ formed integral with a resilient tongue 14 obtained by producing recesses 13 in the wall of the half $3^1$ of a housing $1^1$.

Figure 5:
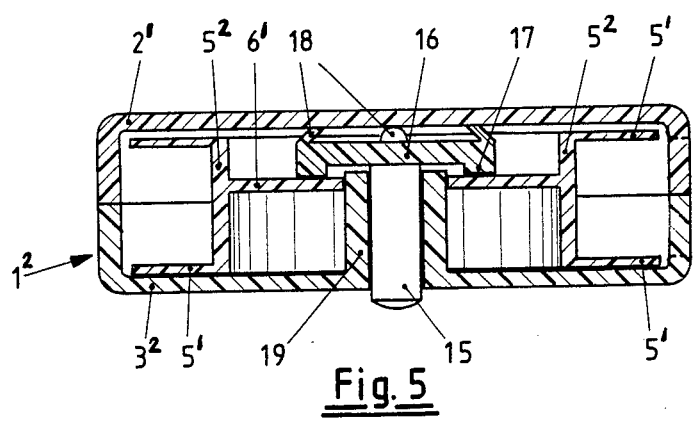
FIG. 5 is a longitudinal section through the roll tape measure according to another embodiment of the invention, without measuring tape and tension spring.

In the roll tape measure shown in FIG. 5 of the drawings an axially displaceable plastic pressure bolt 15 is provided which extends by one of its ends from a housing $1^2$, its other end having an approximately circular enlargement or brake member 16 integral with the pressure bolt 15. An annular brake body 17, coaxial with the pressure bolt 15 is formed integral with one side of the enlargement 16. Elastic tongues 18, arranged annular and slanting inwards, are formed integral with the other side of the enlargement 16 and rest with prestressing against the inner face of the wall of the housing half $2^1$. The annular brake body 17 rests against the cheek $6^1$ of the drum $5^2$ under the effect of the pressure of the elastic tongues 18. The pressure bolt 15 is non-rotatable, yet shiftable in the axial direction, in a shaft body 19. The shaft body 19, on which the drum $5^2$ is mounted, is formed integral with the inner face of the wall of the plastic housing half $3^2$. When pressure is exerted with the finger on that end of the pressure bolt 15 which extends from the housing $1^2$, the resilient tongues 18 are subjected to further tension, the brake body 17 being thus moved away from the cheek $6^1$ of the drum $5^2$, after which the drum $5^2$ is enabled to rotate back.

Figure 6:
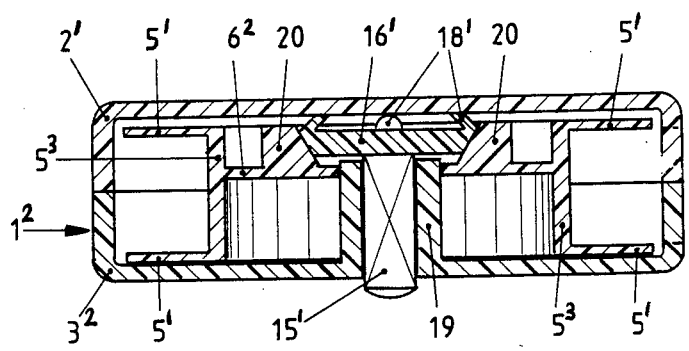
FIG. 6 is a longitudinal section through the roll tape measure according to a further embodiment of the invention, without measuring tape and tension spring.

In the roll tape measure shown in FIG. 6 of the drawings the enlargement $16^1$ is bevelled on its periphery towards the pressure bolt $15^1$ and forms the brake body. An annular brake casing 20 is formed integral with the cheek $6^2$ of the drum $5^3$ and is provided on its internal periphery with a bevelling parallel to that of the brake body. The brake body rests against the annular brake casing 20 under the effect of the pressure exerted by elastic tongues $18^1$ resting with prestressing against the inner face of the wall of the half $2^1$ of the housing $1^2$. Also in this embodiment the pressure bolt $15^1$ extends somewhat through the half $3^2$ of the housing $1^2$.

The invention may be embodied in other specific forms without departing from the spirit or essential characteristics thereof. The embodiments are therefore to be considered in all respects as illustrative and not restrictive.

What is claimed is:

1. A tape measure comprising:
(a) a hollow casing comprising spaced substantially parallel first and second walls and an annular wall connecting said spaced first and second walls about their respective peripheries, said annular wall having an aperture therein;
(b) a cylindrical shaft within said casing and integral with said first wall and projecting towards but terminating a spaced distance from said second wall, a passage extending through said first wall and said cylindrical shaft;
(c) a drum rotatably mounted on said cylindrical shaft and having one side thereof spaced from the interior surface of said second wall;
(d) an elongated flexible tape secured at one end to said drum and being normally wound thereon, the opposite end of said tape passing through said aperture in said annular wall;
(e) means in said casing operatively engaged with said drum for biasing said drum in a rotary direction for winding said tape on said drum; and
(f) manually releasable means for preventing rotation of said drum in said rotary direction by said biasing means and retaining said drum in a fixed rotary position;
(g) said manually releasable retaining means comprising an axially displaceable member passing through and extending beyond the opposite ends of said passage in said first wall and said cylindrical shaft, one end of said axially displaceable member projecting from the exterior surface of said first wall, and a plastic brake member mounted on the end of said axially displaceable member opposite said one end thereof and extending transverse to the axis of said axially displaceable member and between said interior surface of said second wall and said one side of said drum, said brake member comprising a surface on one side thereof facing said one side of said drum for frictionally engaging said one side of said drum and a plurality of plastic elastic tongues integral with said brake member and projecting from the side of said brake member and confronting said interior surface of said second wall, said tongues impinging against said interior surface of said second wall and biasing said brake member towards said one side of said drum such that said surface on said one side of said brake member frictionally engages said one side of said drum;
(h) whereby when said tape is extended from said casing said drum is normally retained in a fixed rotary position by said brake member and upon manual depression of said axially displaceable member said plurality of elastic tongues are depressed against the interior surface of said second wall and said surface of said brake member is moved out of contact with said one side of said drum and towards said second wall so that said biasing means causes said drum to be rotated in said one direction and said tape to be retracted and wound on said drum.

2. A tape measure according to claim 1 wherein said axially displaceable member is composed of a plastic material and is integral with said plastic brake member.

3. A tape measure according to claim 1 wherein said plastic brake member comprises an integral plastic annular brake body projecting towards said one side of said drum, the surface of said annular brake body frictionally engaging said one side of said drum.

4. A tape measure according to claim 1 wherein said plurality of plastic elastic tongues are arranged in an annular configuration on said brake member and slant inwardly towards the axis of said axially displaceable member, said plastic elastic tongues resting with prestressing against said inner surface of said second wall.

5. A tape measure according to claim 1 wherein said brake member is cylindrical and is bevelled on its periphery and said one side of said drum comprises an annular brake casing having on its internal peripheral bevelling parallel to that of said brake member, the bevelled surface of said brake member engaging the bevelled surface of said brake body under pressure exerted by said elastic tongues engaging the interior surface of said second wall.

* * * * *